(12) United States Patent
Nikitin et al.

(10) Patent No.: US 11,614,542 B1
(45) Date of Patent: Mar. 28, 2023

(54) LIDAR PHOTOSENSOR AMPLIFICATION CIRCUIT

(71) Applicant: Zoox, Inc., Menlo Park, CA (US)

(72) Inventors: Denis Nikitin, Campbell, CA (US); Riley Andrews, San Francisco, CA (US); Adam Lee Berger, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 1600 days.

(21) Appl. No.: 15/675,652

(22) Filed: Aug. 11, 2017

(51) Int. Cl.
*G01S 17/89* (2020.01)
*G01S 17/00* (2020.01)
*G01S 17/58* (2006.01)

(52) U.S. Cl.
CPC .......... *G01S 17/89* (2013.01); *G01S 17/003* (2013.01); *G01S 17/58* (2013.01)

(58) Field of Classification Search
CPC ......... G01S 17/89; G01S 17/58; G01S 17/003
USPC ...................................................... 356/4.01
See application file for complete search history.

(56) References Cited

U.S. PATENT DOCUMENTS

| | | | |
|---|---|---|---|
| 4,380,766 A * | 4/1983 | Bachtiger | G01S 7/2921 327/407 |
| 10,177,713 B1 * | 1/2019 | Far | H03F 3/45928 |
| 10,556,585 B1 * | 2/2020 | Berger | B60W 30/09 |
| 2002/0003617 A1 * | 1/2002 | Doemens | G01S 17/89 356/4.01 |
| 2016/0014362 A1 * | 1/2016 | Kurokawa | H01L 27/14609 348/297 |
| 2017/0005626 A1 * | 1/2017 | Zhu | H04B 1/48 |
| 2017/0040361 A1 * | 2/2017 | Ikeda | H01L 31/162 |
| 2017/0242108 A1 * | 8/2017 | Dussan | G01S 7/487 |
| 2017/0261371 A1 * | 9/2017 | Mheen | G01S 7/4817 |
| 2017/0269198 A1 * | 9/2017 | Hall | G01S 17/42 |
| 2018/0198413 A1 * | 7/2018 | Ogomi | H03G 1/0088 |
| 2019/0247019 A1 * | 8/2019 | Savord | G01S 7/5208 |

\* cited by examiner

*Primary Examiner* — Daniel L Murphy
(74) *Attorney, Agent, or Firm* — Lee & Hayes, P.C.

(57) ABSTRACT

A lidar photosensor amplification circuit may include light sensors; amplifiers corresponding respectively to the light sensors, in a powered-on state, to amplify output signals of the respective light sensors as amplified outputs; and switches corresponding respectively to the amplifiers, where individual switches may be controlled to pass a respective amplified output in a closed state or disconnect the amplified output in an open state. The lidar photosensor amplification circuit may be controlled by a controller according to timing rules that conserve power supplied to photosensor amplification circuit, reduce heat produced by the light sensor board, and do not aggravate cross-talk between sensors. The timing rules include staging an amplifier for a staging time before the corresponding light sensor is to be read, closing a switch after the staging time has passed, and powering down the amplifier and opening the switch after a reading time passes.

21 Claims, 10 Drawing Sheets

FIG. 6A

| CLOCK EDGE | BANK 1 PHOTOSENSOR AMPLIFICATION CIRCUIT STATE | | BANK 2 PHOTOSENSOR AMPLIFICATION CIRCUIT STATE | | BANK 1 LIGHT EMITTER ACTIVITY | BANK 2 LIGHT EMITTER ACTIVITY | LIGHT SENSOR VISIBLE TO BANK 1 ADC | LIGHT SENSOR VISIBLE TO BANK 2 ADC |
|---|---|---|---|---|---|---|---|---|
| 0 | TIA 0: STAGING / SWITCH 0: OPEN | TIA 2: OFF / SWITCH 2: OPEN | TIA 1: OFF / SWITCH 1: OPEN | TIA 3: OFF / SWITCH 3: OPEN | | | RESET | RESET |
| 1 | TIA 0: ON / SWITCH 0: CLOSED | TIA 2: OFF / SWITCH 2: OPEN | TIA 1: STAGING / SWITCH 1: OPEN | TIA 3: OFF / SWITCH 3: OPEN | LASER 0 FIRES | | PHOTODIODE 0 | |
| 2 | TIA 0: ON / SWITCH 0: CLOSED | TIA 2: OFF / SWITCH 2: OPEN | TIA 1: ON / SWITCH 1: CLOSED | TIA 3: OFF / SWITCH 3: OPEN | | LASER 1 FIRES | PHOTODIODE 0 | PHOTODIODE 1 |
| 3 | TIA 0: OFF / SWITCH 0: OPEN | TIA 2: ON / SWITCH 2: CLOSED | TIA 1: ON / SWITCH 1: CLOSED | TIA 3: STAGING / SWITCH 3: OPEN | LASER 2 FIRES | | PHOTODIODE 2 | PHOTODIODE 1 |
| | | TIA 4: OFF / SWITCH 4: OPEN | | TIA 5: OFF / SWITCH 5: OPEN | | | | |
| 4 | TIA 2: ON / SWITCH 2: CLOSED | TIA 4: STAGING / SWITCH 4: OPEN | TIA 3: ON / SWITCH 3: CLOSED | TIA 5: OFF / SWITCH 5: OPEN | | LASER 3 FIRES | PHOTODIODE 2 | PHOTODIODE 3 |

602

| CLOCK EDGE | BANK 1 PHOTOSENSOR AMPLIFICATION CIRCUIT STATE | | BANK 2 PHOTOSENSOR AMPLIFICATION CIRCUIT STATE | | BANK 1 LIGHT EMITTER ACTIVITY | BANK 2 LIGHT EMITTER ACTIVITY | LIGHT SENSOR VISIBLE TO BANK 1 ADC | LIGHT SENSOR VISIBLE TO BANK 2 ADC |
|---|---|---|---|---|---|---|---|---|
| 0 | TIA 0: STAGING / TIA 2: OFF | SWITCH 0: OPEN / SWITCH 2: OPEN | TIA 1: STAGING / TIA 3: OFF | SWITCH 1: OPEN / SWITCH 3: OPEN | | | RESET | RESET |
| 1 | TIA 0: ON / TIA 2: OFF | SWITCH 0: CLOSED / SWITCH 2: OPEN | TIA 1: ON / TIA 3: OFF | SWITCH 1: CLOSED / SWITCH 3: OPEN | LASER 0 FIRES | LASER 1 FIRES | PHOTODIODE 0 | PHOTODIODE 1 |
| 2 | TIA 0: ON / TIA 2: STAGING | SWITCH 0: CLOSED / SWITCH 2: OPEN | TIA 1: ON / TIA 3: STAGING | SWITCH 1: CLOSED / SWITCH 3: OPEN | | | PHOTODIODE 0 | PHOTODIODE 1 |
| 3 | TIA 0: OFF / TIA 2: ON / TIA 4: OFF | SWITCH 0: OPEN / SWITCH 2: CLOSED / SWITCH 4: OPEN | TIA 1: OFF / TIA 3: ON / TIA 5: OFF | SWITCH 1: OPEN / SWITCH 3: CLOSED / SWITCH 5: OPEN | LASER 2 FIRES | LASER 3 FIRES | PHOTODIODE 2 | PHOTODIODE 3 |
| 4 | TIA 2: ON / TIA 4: STAGING | SWITCH 2: CLOSED / SWITCH 4: OPEN | TIA 3: ON / TIA 5: STAGING | SWITCH 3: CLOSED / SWITCH 5: OPEN | | | PHOTODIODE 2 | PHOTODIODE 3 |

FIG. 6B

LIDAR PHOTOSENSOR AMPLIFICATION CIRCUIT

BACKGROUND

The term "lidar" refers to a technique for measuring distances to visible surfaces by emitting light and measuring properties of the reflections of the light. The term is a combination of parts of the words "light" and "radar," although the term is often thought of as an acronym for "Light Detection and Ranging." As used herein, the term "lidar" refers to a distance measuring technique that is based on determining the propagation time of light between a measuring device and one or more target points.

A lidar system typically has at least one light emitter and a corresponding light sensor. The light emitter may include a laser such as an injection laser diode (ILD) that directs highly coherent light in the direction of an object or surface. The light sensor may include a photodetector such as a photomultiplier or avalanche photodiode (APD) that converts light intensity to a corresponding electrical signal. Optical elements such as lenses or mirrors may be used in the light transmission and reception paths to focus and direct light.

A lidar system has signal processing components that analyze reflected light signals to determine the distances to surfaces from which the emitted laser light has been reflected. For example, the system may measure the propagation time of a light signal as it travels from the laser emitter, to the surface, and back to the light sensor. A distance is then calculated based on the flight time and the known speed of light.

Some lidar devices can measure the distances of multiple surface points within a scene. For each surface point, the lidar system can determine both the distance of the surface point and its angular direction with respect to the device. This capability can be used to create a point cloud including three-dimensional coordinates of the multiple surface points.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6A is a state and timing diagram illustrating example timing rules for operating the example lidar photosensor amplification circuit of FIG. 3B.

FIG. 6B is a state and timing diagram illustrating example timing rules for operating the example lidar photosensor amplification circuit of FIG. 3B at a higher frequency.

DETAILED DESCRIPTION

Figure 1:
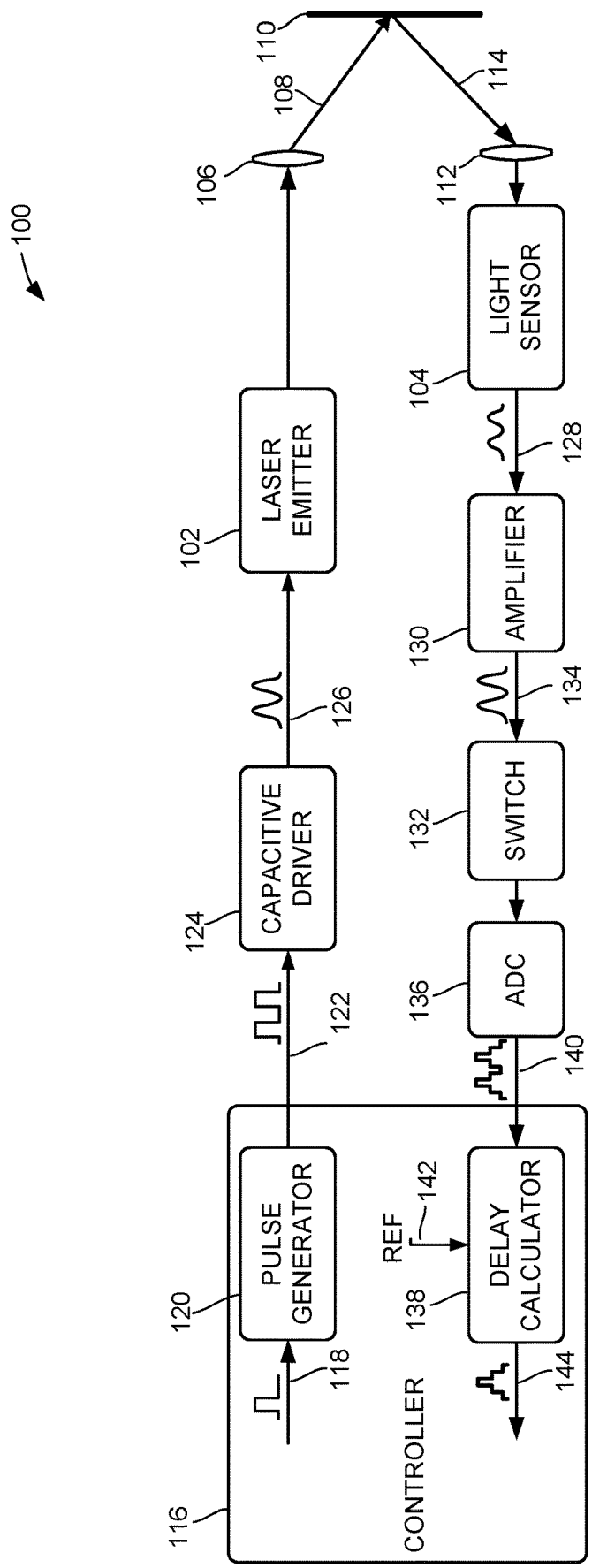
FIG. 1 is a block diagram illustrating high-level components that may be used in a lidar channel of an example lidar system.

A lidar photosensor amplification circuit and associated techniques for sensing light via the lidar photosensor amplification circuit are described herein. The apparatus and techniques discussed may be used in various types of vision systems to produce point clouds indicating the three-dimensional (3D) coordinates of surfaces that are visible from the perspective of the apparatus. As an example, the apparatus and techniques may be used by guidance, navigation, and control systems of autonomous vehicles such as automobiles, aircraft, boats, etc. The apparatus and techniques may also be used in other applications that have a need for real-time, multi-point, scanning distance measurements, such as, for example, robots, manned vehicles, and computer vision systems.

In some examples, the lidar photosensor amplification circuit may include a light sensor, an amplifier, and a switch. In some examples, the amplifier may be configured to amplify an output of the light sensor, and the switch may be configured to control whether the output of the amplifier (i.e., the amplified output signal of the light sensor) is passed to a downstream component such as, for example, an analog-to-digital converter ("ADC") and/or other light sensing processing units. When more than one light sensor is implemented (i.e., to increase field of view, resolution of a resultant point cloud, and system redundancy), each light sensor of the lidar system may similarly be connected to an amplifier and switch.

In some examples, the lidar photosensor amplification circuit may further include a controller and a decoder. In an example where multiple light sensors and corresponding amplifiers and switches are used, in order to "read" (i.e., sense the output of) a particular one of the multiple light sensors, the controller may be configured to produce a signal that identifies that a signal is generated from a particular light sensor. The controller may transmit the signal identifying the light sensor to the decoder, which may be configured to use the identifier signal to produce a control signal that closes a switch that corresponds to the identified light sensor, allowing the amplified signal of the identified light sensor to pass to components for reading the signal. This decoder and switch arrangement is referred to herein as the multiplexer arrangement of the lidar photosensor amplification circuit.

In some example multiplexer arrangements, the amplifiers of the multiple light sensors are powered on at substantially the same time as the light sensors and remain on so that the signal produced by the light sensors is adequately amplified for downstream components to read the signal. However, this causes the lidar sensor system to heat to high levels in a matter of seconds after being turned on. For a system implementing thirty-eight light sensors and using such multiplexer arrangements, a temperature of 100° C. was observed at a power draw of approximately 8 watts for this arrangement of the lidar photosensor amplification circuit.

In some examples, the lidar photosensor amplification circuit includes the light sensor, the amplifier, and the switch. In this example, a controller may produce control signals that directly control both the switch state and power of the amplifier. For example, where the lidar system includes multiple light sensors and their corresponding amplifiers and switches, in order to read a particular light sensor of the multiple light sensors, the controller may generate a clock signal, an amplifier power control signal, and a switch control signal.

The clock signal may be any suitable timing signal and may have a frequency that suits a light emitter firing rate, a frequency of rotation of a housing that contains the light sensors, and/or a desired refresh rate or resolution of a resultant point cloud. In some examples, this frequency may be between 1 megahertz and 1.5 megahertz, though any other frequency is contemplated. In various examples, the clock signal may be a square wave, or close electrical approximations thereof, though any other periodic function is contemplated. The controller may be connected to the amplifiers that correspond with respective light sensors, so that an amplifier power control signal generated by the controller powers a particular amplifier on or off. The controller may also be connected to the switches, so that a switch control signal generated by the controller opens and closes switches.

In some examples, the techniques discussed herein include timing rules that configure the controller to generate, with reference to the clock signal, the amplifier power control signal and the switch control signal according to a specified sequence that reduces power consumption by, for example, over a factor of eight and decreases heat of the sensor system. Moreover, the lidar photosensor amplification circuit and techniques discussed herein may also minimize the number of electrical connections necessary to read the light sensors while simultaneously decreasing power consumption and heat production. By implementing the timing rules discussed herein, gain of the photodiodes' signals may also be increased.

Some amplifiers may create transient signals (e.g., a spike, noise, other disturbances) when they are powered on, and/or they may not instantly reach an amplification steady state within an amount of time that corresponds to the light emission and/or read frequency. This interferes with accurately reading the light sensors. Moreover, additional logic and/or hardware to fix this problem may require modifying the board on which the lidar photosensor circuit is implemented and/or may require modifications to other components such as the digital signal processing ("DSP") board chosen, physical changes to the housing, etc., in order to accommodate extra pins, signals, and/or logic storage or processors to remedy this issue.

In some examples, the timing rules configure the controller to enable reading a particular light sensor by powering on its corresponding amplifier, allowing the amplifier to reach a steady state, subsequently closing the corresponding switch, reading the light sensor, then powering down the amplifier and opening the switch substantially simultaneously. The timing rules and configuration of the controller discussed herein control timing of powering on the amplifiers and closing the switches to read multiple light sensors accurately (e.g., without interference from the amplifiers and/or dead channel(s)) and does so without the need for changing the number of input and output pins of the board on which the lidar photosensor amplification circuit is implemented.

In some examples, the timing rules may configure the controller to control multiple banks of light sensors and their corresponding amplifiers and switches. In an example where multiple banks (groups) of light sensors are used, the lidar may include a number of analog-to-digital converters (ADCs) that corresponds to the number of banks implemented. In some examples, for an example where multiple banks are implemented, the timing rules may configure the controller to send amplifier control signals such that multiple amplifiers are powered on at once. As discussed herein, "staging" an amplifier refers to powering on the amplifier before the corresponding switch is closed (i.e., the amplifier is powered on before its corresponding light sensor is read so that any transient signals caused by turning on the amplifier are hidden behind the opened switch and/or so that the amplifier can reach a steady state before the light sensor is read). Note that, as used herein, steady state means a point or duration of time for which the amplifier is operational. In other words, steady state refers to the amplifier consistently amplifying a received signal.

In some examples, the controller may additionally or alternatively generate a reset signal and/or a dead pin signal. In some examples, the controller may generate a reset signal that pauses the lidar system from emitting light (e.g., controlling signals at a pulse generator) and/or from sensing light (e.g., pauses the controller from closing the switches corresponding to the light sensors). In some examples, the controller may conduct a calibration phase to identify whether any of the channels are dead. For purposes of discussion, the term "channel" is used herein to refer to an individual laser emitter, corresponding light sensor, and the circuitry associated with the emitter and light sensor to emit light and read reflected light. In an example where a channel is dead, the controller may be configured to generate a dead pin signal that skips reading reflected light via the dead channel, as discussed in more detail below.

In some examples, the channels are divided into multiple banks. For example, and as discussed herein, the channels are divided into two banks, although more banks may be used. In some examples, the capacitors corresponding to the laser emitters of one bank are charged while the laser emitters of the other charging bank are being fired. In additional or alternate examples, the emitters may be simultaneously fired to reduce cross-talk at higher firing/reading frequencies (e.g., 1.5 MHz). This allows for an increased firing/reading frequency across the bank of the channels as compared to using a single bank, which would result in a lower firing/reading frequency because of the rate at which the capacitors of each channel can be charged.

In some examples, the channel firing/reading order (i.e. the order in which emitters are excited and sensors are read) is selected to maximize the physical distance between consecutively-fired laser emitters, in order to further minimize potential for inter-channel cross-talk. In some examples, the channel order may be subject to constraints that (a) consecutively-fired channels are associated with different ADCs and/or (b) the order should repeatedly specify first all the channels of the first charging bank and then all the channels of the second charging bank. Note that each bank includes channels of both ADC groups. For the sake of clarity, discussion herein of a "first" component of a channel, such as a "first light sensor," may be a first light sensor according to the channel order, even though that light sensor might have another identifier associated with it (e.g., "light sensor #4," "fourth sensor of a second row").

Example Lidar System

FIG. 1 illustrates logical elements of a lidar distance measurement system 100 that may be used to perform distance or ranging measurements using or in conjunction with a laser/sensor arrangement. FIG. 1 shows control components that may be shared among multiple laser/sensor components (e.g., controller, pulse generator, delay calculator, ADC, capacitive driver) for implementations employing multiple channels as well as elements that are dedicated to a single measurement channel (e.g., laser emitter, light sensor). The illustrated example depicts a system for emitting light from a single laser emitter and receiving reflected light at a corresponding light sensor. One skilled in the art would understand that the light emitters and light sensors may be multiplied in number beyond the single laser emitter and light sensor depicted, although this may introduce the problems addressed by the techniques discussed herein.

In some examples, the laser emitters and light sensors may have similar or identical physical arrangements or layouts with respect to the overall field of view of the apparatus. In some examples, the lidar system may include a chassis that houses the respective components discussed herein. This chassis may be configured to rotate or to be rotated in order to provide a 360-degree field of view. For example, the light sensors may be arranged within a sensor image frame having an x axis and an orthogonal y axis. In the illustrated embodiments in which the rotational axis is vertically aligned, the x axis corresponds to the horizontal axis of the scene and the y axis corresponds to the vertical axis of the scene.

In some examples, the light sensors are arranged as a series of staggered rows that are tilted slightly from the x axis. The two-dimensional nature of this layout allows the photodiodes to have an effective resolution, corresponding to a y-axis pitch, that is smaller than the diameter of the sensor components themselves and smaller than would be possible with a linear arrangement.

In some examples, the amount of tilt from the x axis is selected so that the light sensors have a uniform spacing or pitch relative to the y axis of the sensor image frame. In other examples, the y-axis spacing of the lasers and/or light sensors may be non-uniform.

In some examples, the laser emitters are arranged similarly within an emitter image frame. The emitter image frame has an x axis, also referred to herein as a scan axis, that corresponds to the x axis of the sensor frame. The emitter image frame has a y axis that corresponds to the y axis of the sensor frame. The one or more lenses direct light produced by the emitters from the emitter image frame outwardly into the field of view of the one or more lenses. In various examples, the laser emitters need not be so similarly arranged. As a non-limiting example, the laser emitters may be disposed about a radius of curvature such that reflected light aligns with the light sensors.

A channel includes one of the laser emitters 102 and a corresponding one of the light sensors 104. Each laser emitter corresponds to a respective light sensor, and a pair including an emitter and a corresponding light sensor is referred to as a channel. The term "channel" may also encompass supporting circuitry that is associated with the emitter/sensor pair. A channel is used to emit a laser light pulse and to measure properties of the reflections of the pulse, as explained below. For a single distance measurement, the laser emitter 102 is controlled to emit a burst of laser light pulses (i.e. one or more) through a lens 106 along an outward path 108. The burst is reflected by a surface 110 of an environment surrounding the lidar, through the lens 112, and to the light sensor 104 along a return path 114. In some examples, the lidar may include multiple laser emitters positioned within as chassis to project laser light outward through the one or more lenses. In some examples, the lidar may also include multiple light sensors so that light from any particular emitter is reflected through the one or more lenses to a corresponding light sensor.

In some embodiments, laser emitters that produce light at different wavelengths may be used in order to reduce cross-talk between consecutively or simultaneously used channels. For example, some of the laser emitters may emit light at 905 nanometers, and others of the laser emitters may emit light at 1064 nanometers. The laser emitters of the different wavelengths can then be used alternately, so that the emitted light alternates between 905 nanometers and 1064 nanometers. The light sensors can be similarly configured to be sensitive to the respective wavelengths and to filter other wavelengths.

In some examples, the lens 106 and the lens 112 are the same lens, depicted redundantly for clarity. In other examples, the lens 112 is a second lens designed so that beams from laser emitters 102 at different physical positions within a housing of the lidar are directed outwardly at different angles. Specifically, the first lens 106 is designed to direct light from the laser emitter 102 of a particular channel in a corresponding and unique direction. The second lens 112 is designed so that the corresponding light sensor 202 of the channel receives reflected light from the same direction. In some examples, the one or more lenses are configured so that light from a laser emitter at a particular x-y position (regardless of any curvature of the emitter pattern) relative to the emitter frame is directed outwardly in a corresponding direction. Received light from that same direction is directed inwardly by the one or more lenses to the corresponding light sensor, which is at the same x-y position relative to the sensor frame.

In some examples, the light sensors may be mounted on a single, planar printed circuit board. The laser emitters may be mounted on multiple printed circuit boards in one example or on a single printed circuit board in another example. In an example utilizing multiple emitter boards, each emitter board may support a corresponding row of the laser emitters, and the laser emitters are mounted on edges of the boards to point toward the one or more lenses. In some examples, the edges of the emitter boards may be curved, and the emitter boards may be inclined inwardly with respect to each other so that the laser emitters are all equidistant from a lens entrance pupil and are also all directed to converge at the lens entrance pupil.

In some examples, the system 100 may include a controller 116 that implements control and analysis logic for multiple channels. The controller 116 may be implemented in part by a field-programmable gate array ("FPGA"), a microprocessor, a DSP, or a combination of one or more of these and/or other control and processing elements, and may have associated memory for storing associated programs and data. In some examples, the controller 116 may be configured by the timing rules discussed herein.

To initiate a single distance measurement using a single channel, the controller 116 may generate a trigger signal 118. The trigger signal 118 may be received by a pulse generator 120. In response to receiving the trigger signal 118, the pulse generator 120 generates a burst signal 122. In some examples, the burst signal 122 may include a pair of sequential pulses that indicate the times at which the laser emitter 102 should be activated or turned on. Activating or turning on the emitter may be referred to as "firing" the emitter. Each emitter is fired to create a light pulse having a short duration.

In some examples, the rising edges of the pulses may be used to indicate the times at which the laser emitter 102 should be activated or turned on. As illustrated in FIG. 1, the function of the pulse generator 120 may, in actual implementation, be performed by the controller 116.

The burst signal 122 may be received by a capacitive driver 124. The capacitive driver 124, in response, may provide an emitter drive signal 126. The emitter drive signal 126 may include a pair of sequential energy pulses, corresponding in time to the pulses of the burst signal 122. In some examples, the capacitive driver 124 and laser emitter 102 are connected such that the emitter drive signal 126 causes the laser emitter to fire, emitting pulses of laser light. Though depicted in FIG. 1 as two pulses for illustrative purposes, any number of pulses (e.g. one or more) is contemplated.

In some examples, the pulses are temporally spaced from each other by a time interval, the duration of which may be varied over time and between channels to reduce the impact of cross-talk. Cross-talk may occur, for example, when a light sensor receives a reflection of light that was emitted by an emitter of a different channel, or when a light sensor receives at least some light that was emitted from another LIDAR apparatus. Varying the pulse spacing reduces ambiguity between different light emissions, so that the cross-correlation inherently tends to mask out reflected bursts whose spacings are different than the spacing of the originally emitted burst. The spacing can be varied across the different channels and/or may be varied over time for an individual channel. For example, the pulse spacing for each channel may be changed randomly for every rotation of the chassis.

Assuming that the emitted laser light is reflected from the surface 110, the light sensor 104 receives the reflected light and produces a return signal 128 (or a light sensor output signal). The return signal 128 is generally of the same shape as the emitter drive signal 126, although it may differ to some extent as a result of noise, interference, cross-talk between different emitter/sensor pairs, interfering signals from other LIDAR devices, and so forth. The return signal 128 will also be delayed with respect to the emitter drive signal 126 by an amount corresponding to the round-trip propagation time of the emitted laser burst. In some examples, the channels are used in a predefined order according to the timing rules, at a rate such that each channel measurement is initiated during the maximum expected flight time of a laser burst emitted by a previous channel. Thus, two (or potentially more) laser pulses and/or bursts may be "in flight" at any given time.

In some examples, the return signal 128 produced by the light sensor 104 lacks characteristics that make it suitable for reading by downstream components (e.g., an ADC), such as being too weak or noisy. In some examples, the lidar includes a lidar photosensor amplification circuit that includes the light sensor 104, an amplifier 130, and a switch 132. In some examples, the light sensor 104 may include an avalanche photodiode ("APD") and the amplifier 130 may correspondingly be a current-to-voltage converter amplifier such as, for example, a transimpedance amplifier ("TIA"). Regardless, the amplifier 130 may be any amplifier configured to transform the return signal 128 so that downstream components that read the signal can do so accurately. In some examples, the lidar photosensor amplification circuit may be implemented on one board, the controller 116 on another board, and the ADC 136 on an additional board. For a lidar system that implements thirty-eight channels, for example, the lidar photosensor amplification circuit configuration and techniques discussed herein do not require a different number of pins on the lidar photosensor amplification circuit board than is required for the multiplexer configuration discussed above.

In some examples where the lidar includes multiple channels, the lidar photosensor amplification circuit may further include a switch 132 for controlling which light sensor is being read. The amplifier 130 may output an amplified return signal 134 (also referred to herein as an amplified output signal, referring to output of the light sensor), and the switch may block (e.g., break, float, disconnect) the amplified output signal in an open state and pass the amplified output signal in a closed state. In the closed state, the amplified return signal 134 may be read by downstream components (e.g., ADC 136, delay calculator 138). In some examples, a switch 132 may be closed substantially simultaneously as the laser 102 corresponding to the light sensor 104 is fired. In some examples, the switch 132 may be closed after a short delay after the laser 102 is fired.

In some examples, the ADC 136 may receive and digitize the amplified return signal 134 when the corresponding switch 132 is closed to produce a digitized return signal 140. The digitized return signal 140 is a stream of digital values indicating the magnitude of the return signal 140 over time. Note that, in some examples where multiple channels are implemented, the ADC 136 is a shared component, and is used to digitize signals provided by multiple different light sensors 104 at different times. In some examples where multiple channels are divided into multiple banks, there may be one ADC per bank to be able to achieve higher emission/reading frequencies (i.e., a laser burst may be "in flight" while reflected light is being read in such a configuration).

In some examples, two ADCs may be used for a system that implements thirty-eight channels, for example. In some examples, the ADCs may be used in an alternating reading sequence, so that a particular ADC digitizes every other laser emission. For example, the reflection from a first laser burst sensed by a first light sensor is digitized by a first ADC, the reflection from to a second laser burst sensed by a second light sensor is digitized by a second ADC, the reflection from to a third laser burst sensed by a third light sensor is digitized by the first ADC, the reflection from to a fourth laser burst sensed by a fourth light sensor is digitized by the second ADC, and so on. Two ADCs may be used in embodiments where two laser bursts may be in flight at any given time. In other examples, in which multiple laser bursts may be in flight concurrently, additional ADCs may be used. This technique may be implemented for emission/read frequencies around 1 MHz, though any other frequency is contemplated.

As the firing frequency increases, cross-talk may also increase. In an additional or alternate example, the lasers of two different banks may simultaneously fire and the ADCs may be used to simultaneously read the reflected light, as discussed in further detail below. This may reduce cross-talk at higher emission/read frequencies (e.g., 1.5 MHz).

In some examples, a delay calculator 138 receives the digitized return signal 140 and calculates the phase difference or time shift between the light pulses as emitted from the laser emitter 102 and as received at the light sensor 104. In some examples, the delay calculator may include a cross-correlation component that performs a cross-correlation between the digitized return signal 140 and a reference waveform 142, to produce a cross-correlation signal 144. Other methods of determining the phase difference, such as direct peak-to-peak measurements, may be used in other embodiments. As illustrated in FIG. 1, the function of the delay calculator 138 may be performed by the controller 116.

The reference waveform 142 represents the timing and the intensity of the light that is actually emitted by the laser emitter 102. In certain embodiments, the reference waveform 142 may be obtained during a calibration cycle. For example, in some embodiments there may be a reference surface at which the output of the laser emitter can be aimed. The reference surface may in some cases comprise part of the support structure of a chassis of the lidar system, and may be at a known, relatively small distance from the lens(es) 106/112. In some examples, when the output of the laser emitter 102 is directed toward the reference surface, the capacitive driver 124 drives the laser emitter 102 to produce an output burst. The lidar photosensor amplification circuit, including the light sensor 104 and the ADC 136 are then used to capture a waveform corresponding to the light reflected from the reference surface. This captured waveform may be used as the reference waveform 142. The reference waveform 142 may be captured uniquely for each channel, may be stored and used for multiple subsequent measurements, and may be updated over time to account for thermal drift and/or other variables. In some embodiments, the reference waveform 142 may be updated at least once per revolution of the chassis.

The controller 116 may receive the cross-correlation signal 144 and analyze the cross-correlation signal 144 to find its highest peak, which indicates the phase difference or time shift between the light pulses as emitted from the laser emitter 102 and as received at the light sensor 104.

In some examples, during the calibration phase, the reference waveform 142 may be used to identify "dead" channels, which are channels that are no longer accurate due to, for example, a broken component, a broken connection, or degradation of a sensor to name a few. Identification of a dead channel during the calibration phase may be used by the controller 116 to generate a dead pin signal, as discussed in more detail below.

Note that FIG. 1 shows logical components and signals in a simplified manner for purposes of describing general characteristics. In actual implementation, various types of signals may be generated and used in order to fire the laser emitter 102, and to measure the phase difference between the output of the laser emitter and the reflected light that is sensed by the light sensor 104.

Figure 2:
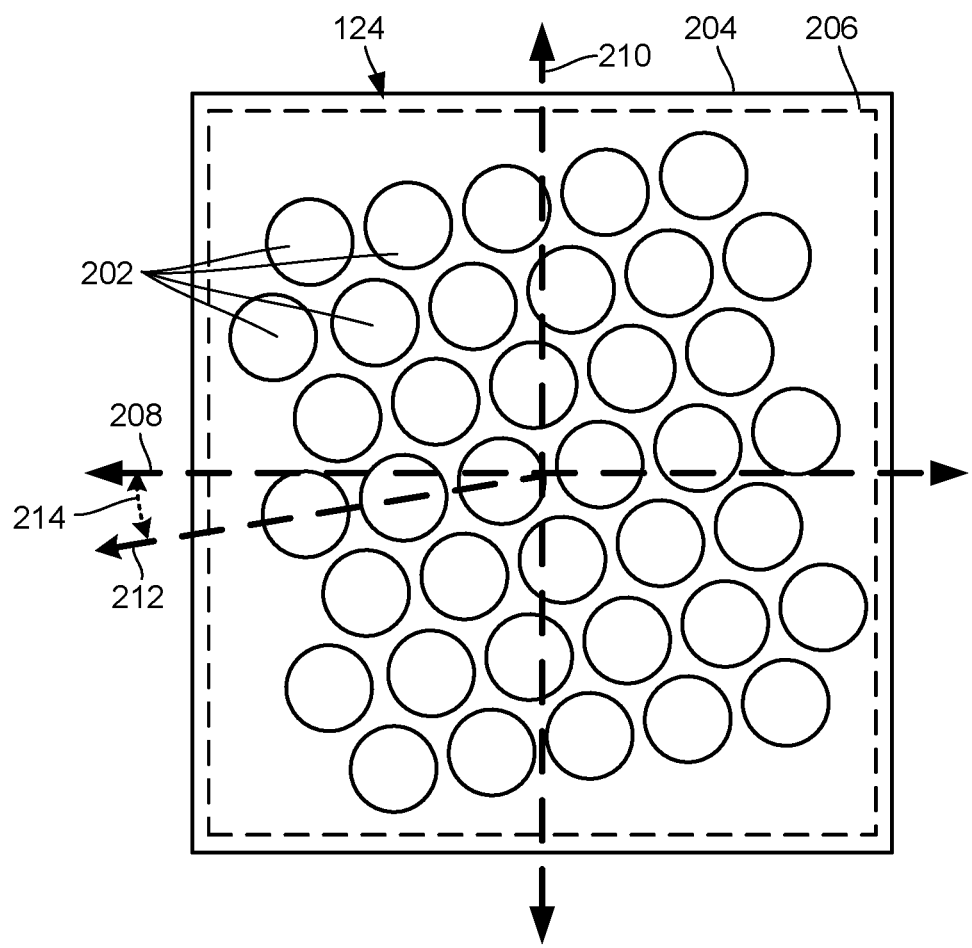
FIG. 2 is a representational top view of an example array of light detectors that may be used in the lidar system of FIG. 1.

FIG. 2 illustrates further details regarding an example array of light detectors 204. The example array of light detectors 204 includes an array of individual light sensors 202. In some examples, the light sensors 202 may include light sensors such as light sensor 104. In some examples, the light sensor 104 may be an APD. The examples described herein include thirty-eight channels and, accordingly, include thirty-eight laser emitters and thirty-eight corresponding light sensors. Different embodiments may use different numbers of channels depending on desired sensor resolutions and coverage angles, where the coverage angle corresponds to the field of view relative to the horizon.

In some examples, the light sensors 202 may be mounted on a planar printed circuit board 204. The light sensors 202 are positioned within a sensor frame 206, which is an area within which the lens 112 projects an image of an external scene. FIG. 2 shows the x axis 208, which may be the axis corresponding to a scan direction of a chassis of the lidar system relative to the scene. The x axis 208, also referred to herein as the scan axis, represents the axis along which an image of the scene is translated as the chassis rotates.

The light sensors 202 are arranged in multiple parallel rows, with alternate rows being staggered to achieve a higher packing density. Each row extends along a line that is angled with respect to the x axis 208 so that each light sensor 202 is at a different elevation relative to the y axis 210, where the y axis 210 is orthogonal to the scan axis 208.

FIG. 2 shows a line 212 along which one row of light sensors 202 extends. The line 212 is at an angle 214 relative to the x axis 208. At the illustrated row pitch, the angle 214 results in each light sensor 202 having a unique y-axis position or elevation. In addition, the light sensors 202 have a uniform y-axis pitch.

Figure 3A:
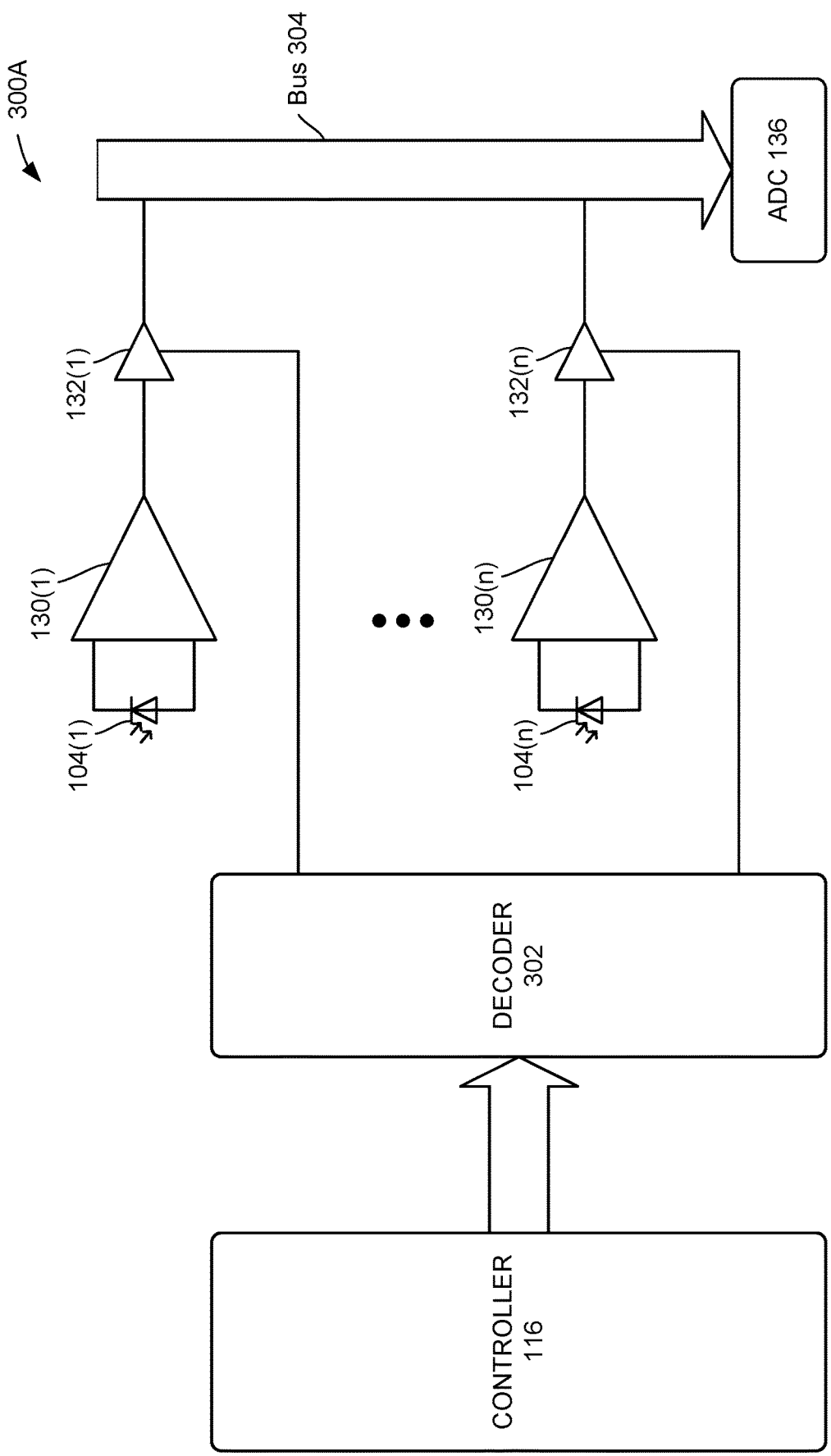
FIG. 3A is a schematic view of an example multiplexer arrangement of a lidar photosensor amplification circuit that may be used to control sensing multiple light sensors.

FIG. 3A illustrates an example multiplexer (i.e., decoder and switch) arrangement 300A of a lidar photosensor amplification circuit that may be used to control sensing of multiple light sensors 104. The example arrangement 300A includes a controller 116, a decoder 302, a number, n, of light sensors 104(1)-(n) (e.g., n APDs), a number, n, of corresponding amplifiers 130(1)-(n) (e.g. TIAs), and switches 132(1)-(n), an ADC 136 which may represent one or more ADCs, and connections therebetween.

In some examples, a configuration of the lidar photosensor amplification circuit may be identical for each channel. A description of one lidar photosensor amplification circuit follows. In some examples, a high voltage bias may be applied to an individual photodiode 104(1), which may thereby sense received light signals. In some examples, the photodiode 104(1) may be connected to an amplifier 130(1), such as a TIA. The amplifier 130(1) may be configured to amplify and/or convert the signal produced by the photodiode 104(1) (i.e., a returned light signal). In some examples, the TIA may convert a current of the output signal of the photodiode 104(1) to a voltage, which is also referred to herein as an "amplified" signal.

The amplifier 130(1) may produce an amplified signal, and its output may be connected to a switch 132(1). In some examples, the switch 132(1) may include a buffer circuit, although any circuit that is suitable to stop the amplified signal from passing to the bus 304 in an "open" state and pass the amplified signal in a "closed" state without disturbing the amplified signal in a manner that detracts from the accuracy of reading the amplified signal is contemplated.

To read the reflected light signal of a particular diode, the example configuration 300A includes a decoder 302. In some examples, the channels may be divided into two banks, in which case the decoder 302 may include two decoders one decoder per bank. For example, in an example employing thirty-eight channels, the example configuration 300A includes n=thirty-eight photodiodes 104(1)-(38), nineteen of which would be devoted to Bank 1 and nineteen of which would be devoted to Bank 2. In some examples, a first decoder 302 may be devoted to controlling which photodiode is being read of the nineteen photodiodes of Bank 1 and a second decoder 302 may be devoted to controlling which photodiode is being read of the nineteen photodiodes of Bank 2.

In some examples, the controller 116 may generate a 6-bit control signal, for a thirty-eight channel system, identifying a particular light sensor. In some examples, the number of bits of the control signal generated by the controller 116 may be dependent on the number of decoders and the number of channels used in a system that uses multiple decoders. The decoder 302 may be connected to the switches 132 and may decode the control signal to identify which switch 132 to closed to allow an output signal of the identified light sensor to be read. In some examples, the decoder 302 keeps all the switches open except for the switch that corresponds to photodiode that is being read so that signals of the other channels do not interfere with reading the current photodiode. In this example, the board that includes the lidar photosensor amplification circuit (i.e., photodiodes, amplifiers, and switches) does not need to include a processing unit and logic. This increases the modularity and scalability of the system.

When a switch 132(n) is closed to allow the amplified signal of an identified photodiode 104(n) to pass, the amplified signal may be passed (e.g., via a bus 304 that connects all of the switches to the ADS 136) to an ADC 136 and/or other components for reading the amplified signal (e.g., determining a distance measurement from the amplified signal).

However, the example configuration 300A may draw approximately 8 watts for thirty-eight channels and may produce an intolerable amount of heat. For example, the heat produced by drawing this amount of power may cause miscalibrations due to thermal drift, exceed power limits allocated to the lidar device or a portion thereof, cause burns or other injuries, etc.

Figure 3B:
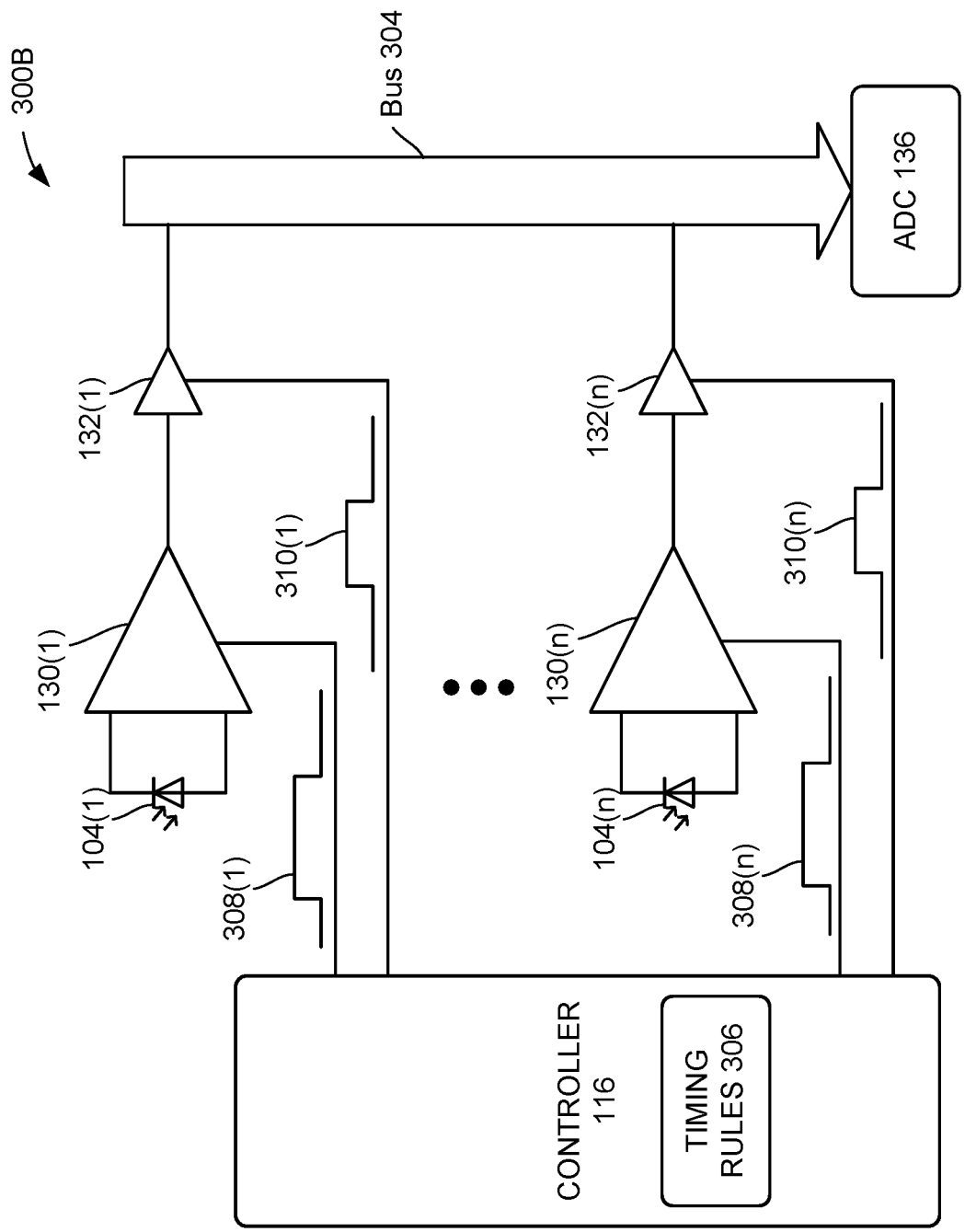
FIG. 3B is a schematic view of an example lidar photosensor amplification circuit that may be used to control sensing multiple light sensors.

FIG. 3B illustrates an example arrangement 300B of a lidar photosensor amplification circuit that may be used to control sensing multiple light sensors 104 according to timing rules 306. The example arrangement 300B includes a controller 116, n number of photodiodes 104(1)-(n) (e.g., n APDs), n number of corresponding amplifiers 130(1)-(n) and switches 132(1)-(n), an ADC 136 which may represent one or more ADCs, and connections therebetween. In this example arrangement 300B, the controller 116 generates an amplifier power control signal 308 to control the power state of the amplifiers 130(1)-(n) and a switch control signal 310 to control the open/closed state of the switches 132(1)-(n) according to timing rules 306. In some examples, the controller 116 may also generate a clock signal, a reset signal, and/or a dead pin signal, as discussed below.

Figure 4:
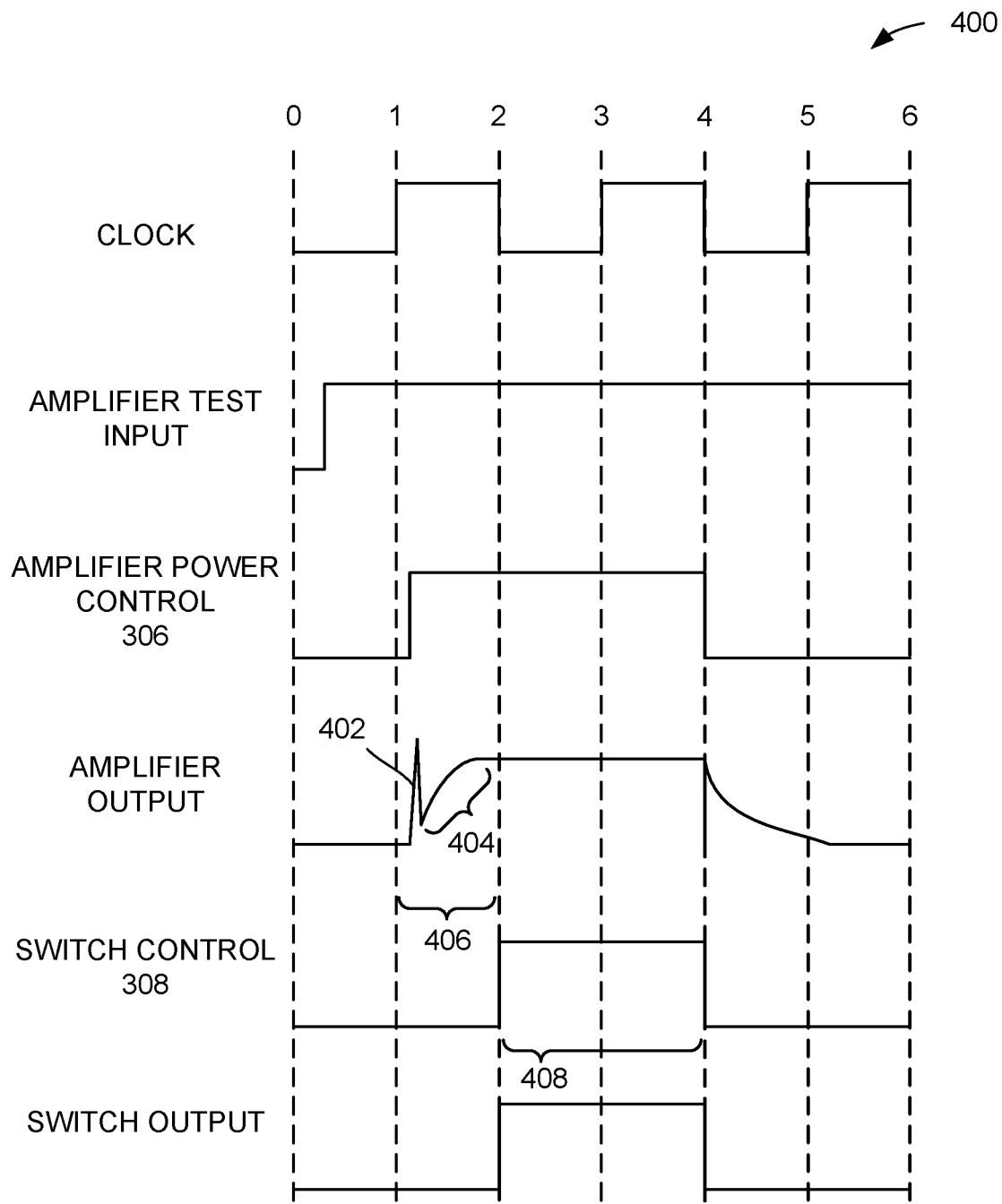
FIG. 4 is an example signal timing diagram for reading an amplified reflected light signal of the photosensor amplification circuit.

As depicted in more detail in FIG. 4, when power is supplied to an amplifier, often the amplifier will output a transient signal such a voltage spike or some other disturbance. Depending on the type of amplifier selected, the amplifier may also take time before it reaches a steady state. Note that turning on an amplifier and waiting the amount of time it takes for the amplifier to reach steady state is referred to herein as "staging" the amplifier. In some examples, for a TIA, this may take about a microsecond or two, depending on the particular type of amplifier. If the switch were closed before the amplifier was on (or had reached a steady state), the transient signal and/or the staging of the amplifier would preclude receiving an accurate reading of the amplified signal from the photodiode.

In some examples, the example configuration 300B and the timing rules 306 may account for the transient signal and staging time while simultaneously minimizing the "on time" of the amplifiers of the channels of the lidar system, minimizing cross talk between channels, and/or maximizing the emission/reading frequency to achieve a high-resolution point cloud. Moreover, the example configuration 300B and the timing rules 306 may reduce the power consumption of the photosensor amplification circuit. For example, such a configuration may reduce the power consumption for a thirty-eight-channel system from 8 watts using configuration 300A to about 250 mW and/or may reduce the heat produced.

In some examples, according to the example configuration 300B the controller 116 may be connected directly to the amplifiers 130(1)-(n) and the switches 132(1)-(n). In some examples, the photodiode 104(1) may be connected to an amplifier 130(1), such as a TIA. The amplifier 130(1) may be configured to amplify and/or convert the signal produced by the photodiode 104(1) (i.e., a returned light signal). In some examples, the TIA may convert a current of the output signal of the photodiode 104(1) to a voltage, which is also referred to herein as an "amplified" signal. In some examples, the switch 132(1) may include a buffer circuit, although any circuit that is suitable to stop the amplified signal from passing to the bus 304 in a "open" state and pass, in an "closed" state, the amplified signal without disturbing the amplified signal in a manner that detracts from the accuracy of reading the amplified signal.

To read the amplified signal from a particular photodiode 104(n), the controller 116 may generate a clock signal that has a frequency that corresponds to the light emitter firing frequency (e.g., between 1 MHz and 1.5 MHz). The controller 116 may use the clock signal and the timing rules 306 to time generation of an amplifier power control signal 308 to power on the corresponding amplifier 130(n) a first defined amount of time before the photodiode 104(n) is to be read (i.e., "staging" the amplifier). In some examples, this first defined amount of time corresponds to the staging time of the amplifier 130(n). For a lidar system that fires one million laser pulses a second (1 MHz emission rate) and employs TIAs with one microsecond staging times, the clock signal may correspondingly have a frequency of 1 MHz), and the first defined amount of time may be one microsecond, which equates to one clock tick at 1 MHz.

After the first defined amount of time passes, the controller 116 may use the clock signal and the timing rules 306 to time generating a switch control signal 310 to close the switch 132(n) so that the amplified signal corresponding to the photodiode 104(n) may be read as the reflected light returns to lidar system. In some examples, the controller 116 may use the clock signal and the timing rules 306 to time generating a switch control signal 310 to open the switch 132(n) after a second defined amount of time. In some examples, the second defined amount of time that corresponds with the pulse emitted by the light emitter 102(n) and allows a sufficient amount of time to read the amplified reflected light signal produced by the lidar photosensor amplification circuit. In some examples, the second defined amount of time (i.e., the read time) may be two clock cycles or two microseconds.

FIG. 4 illustrates an example signal timing diagram 400 for reading an amplified reflected light signal generated by a light sensor. For the sake of simplicity and clarity, instead of attempting to depict a realistic representation of an amplified reflected light wave signal from a light sensor, FIG. 4 depicts an amplifier test input that goes high shortly after the clock signal is instantiated at time 0.

FIG. 4 also depicts an example amplifier power control signal 308 that powers on an amplifier 130(n) at the beginning of clock tick 1 and the amplifier's corresponding output. Note that the time from time 1 to time 2 is referred to herein as the "staging time" 406 and is equivalent to at least the minimum amount of time that it takes for transient signals to pass and/or for the amplifier to reach a steady state. In this example illustration, the amplifier output while the amplifier 130(n) is being staged includes a transient signal 402 and a portion 404 of the amplifier output signal that is approaching steady state.

In some examples, the number of clock ticks that the controller 116 waits before generating a switch control signal 310 that closes the corresponding switch 132(*n*) may correspond to the staging time of the amplifier 130(*n*). In the depicted example, the switch 132(*n*) is configured to close upon receiving a "high" signal, although this is merely done for the sake of illustration and other arrangements are contemplated, such as maintaining a "high" signal to keep the switch open and transmitting a "low" signal to close the switch. Upon generating the switch control signal 310 that closes the switch 132(*n*), the amplified signal from the amplifier 130(*n*) is passed by the switch 132(*n*). The amount of time that the switch is closed is referred to herein as the "read time" 408.

In the example timing diagram 400, to stop reading the amplified signal the controller 116 may generate a switch control signal 310 (or may change a state of the switch control signal, as depicted at time 4) to open the switch 132(*n*). In some examples, the amplifier 130(*n*) may be simultaneously powered off to conserve power usage by generating an amplifier power control signal 308 to power off the amplifier 130(*n*). Depending on the type of amplifier, the amplifier may not immediately stop producing an output, as is depicted in FIG. 4 from time 4 to just past time 5. Since the switch 132(*n*) has been opened this residual charge is of no consequence for the accuracy of the distance measurements read from the sensors.

Figure 5:
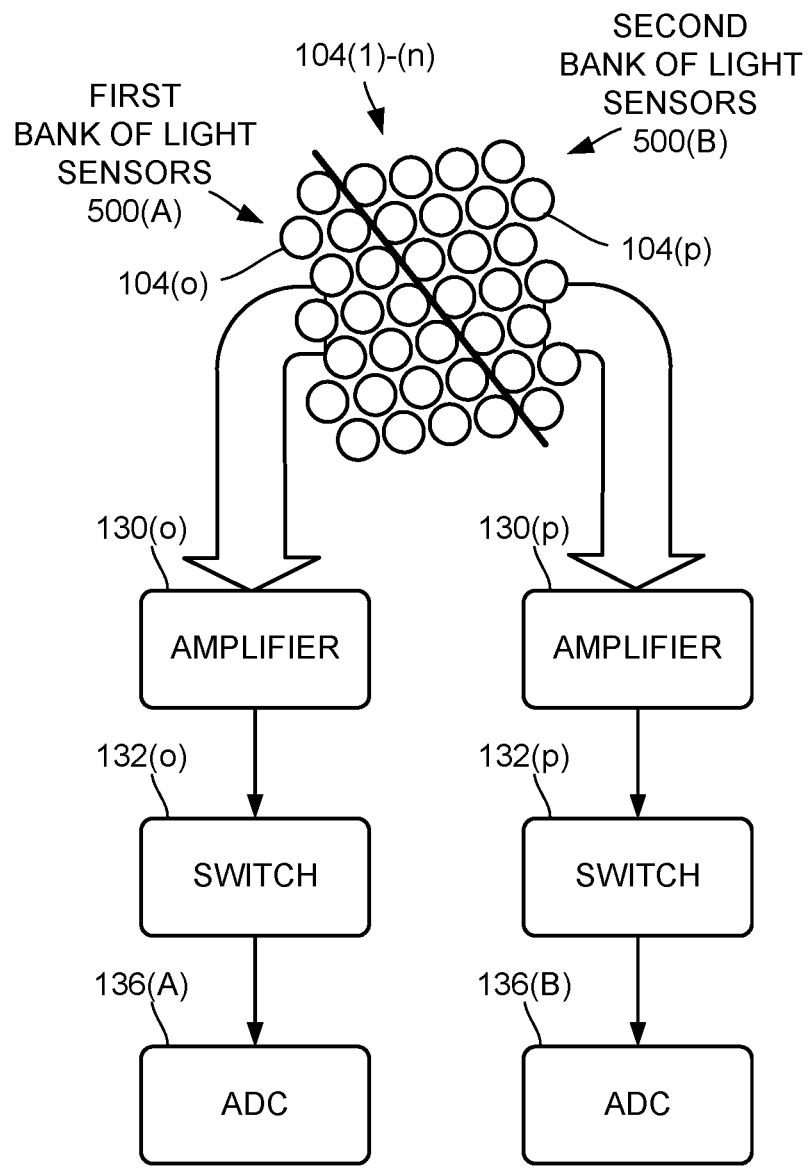
FIG. 5 is a block diagram illustrating an example array of light detectors and their association with different ADC banks.

FIG. 5 depicts a block diagram illustrating an example array of light sensors and their association with different ADCs in a "bank" configuration. FIG. 5 depicts an array of light sensors 104(1)-(*n*) divided into two banks 500(A) and 500(B). Each bank of light sensors 500(A) and 500(B) corresponds to a different ADC 136(A) and 136(B). FIG. 5 also illustrates the connections and components between an o-th light sensor 104(*o*) of the first bank 500(A) and a p-th light sensor 104(*p*) of the second bank 500(B), each of which connected to their respective ADC 136(A) and 136 (B). In some examples, while amplifier 130(*o*) and switch 132(*o*) may be associated with a single light sensor 104(*o*), the depicted ADC 136(A) may be shared among the first bank of light sensors. ADC 136(B) may be similarly associated with the second bank 500(B).

FIGS. 6A and 6B depict a state and timing diagram illustrating example timing rules 600 and 602, respectively, for operating the example lidar photosensor amplification circuit according to the example configuration 300B shown in FIG. 3B. In some examples, the timing rules 306 may include timing rules 600 and/or 602. In some examples the timing rules 600 and/or 602 are hard-coded into the controller 116 and/or downstream components that read the signals output by the photosensor amplification circuit, such as the ADCs 136(A) and 136(B). In some examples, by hard-coding downstream components with the timing rules 600 and/or 602, these components are aware of which photodiode is being "seen" by the downstream components (i.e., which switch is closed, making that amplified photodiode signal transparent to the downstream components).

In some examples, the timing rules 600 and 602 specify a sequence in which the controller 116 generates amplifier power control signals, switch control signals, reset signals, and/or dead pin signals. Note that FIGS. 6A and 6B depict only a portion of a sequence for n number of channels. The sequence may continue, according to the depicted sequence, until the controller 116 iterates through all n channels.

The depicted sequences in FIGS. 6A and 6B illustrate timing rules 600 and 602, respectively, for reading the example lidar photosensor amplification circuit according to configuration 300B for channels 0-3. The timing rules 600 of FIG. 6A include staggering firing/reading between the two banks, whereas the timing rules 602 of FIG. 6B include simultaneously firing/reading the two banks.

In the depicted examples of FIGS. 6A and 6B, the first defined time (i.e., the staging time) corresponds to one clock cycle and the second defined time (i.e., the read time) corresponds to two clock cycles, although the number of clock cycles corresponding to the first defined time may be varied based upon the properties of the amplifiers used (e.g., staging time, transient signals), and the number of clock cycles corresponding to the read time may be varied based on the duration of the emitted laser pulse and/or scene depth.

In FIGS. 6A and 6B, the left-most column identifies the clock edge number of the clock signal. Note that, as used herein, a "clock edge" may include a falling edge or a rising edge, both of which may be a type of transition of the clock cycle. Other clock transitions may include a peak, a falling edge, a rising edge, a midpoint, and/or other features of a clock signal. The next two columns to the right ("Bank 1 Photosensor Amplification Circuit State" and "Bank 2 Photosensor Amplification Circuit State") identify statuses of amplifiers 130 and switches 132 of respective banks 500 of the lidar photosensor amplification circuit at the clock tick identified by the clock edge column. The next two columns to the right ("Bank 1 Light Emitter Activity" and "Bank 2 Light Emitter Activity") identify light emitter activity of the respective banks. The last two columns to the right ("Light Sensor Visible to Bank 1 ADC" and "Light Sensor Visible to Bank 2 ADC") identify which amplified light emitter 104 signal is being passed to (or seen/read by) the ADC of the respective banks. Note that, for the sake of space, the amplifiers are referred to as TIAs in the illustration. The illustrated examples illustrate two banks of channels, although more or less banks of channels may be implemented.

Note that in FIGS. 6A and 6B, the example diagram includes an initialization period at clock edge 0, where a reset signal generated by the controller 116 prevents the switches from being closed because, as of yet, no amplifiers have previously been staged, which means that reading the amplified output signal would result in an inaccurate distance measurement due to transient signals and/or the amplifiers not having reached steady state. In some examples, the initialization phase may include maintaining a high reset signal for a complete iteration of the entire read sequence for all n channels (i.e. powering on and off every amplifier and closing and opening all corresponding switches). In some examples, a high reset signal prevents the switches from being closed. In some examples, upon returning to the 0-th channel after the full iteration, the controller 116 may transition the reset signal to a low signal which allows the switches to be closed. In some examples, the amplifiers may be initialized to a value other than their amplification value (e.g., 0). However, the illustrated examples in FIGS. 6A and 6B assume that this has not been done, and the reset signal is not lifted until clock edge 1.

FIG. 6A depicts a state and timing diagram for operating a lidar photosensor amplification circuit at a frequency of around 1 MHz. If the frequency of channel operation is increased, cross-talk between sensors that are being read increases as the light emission frequency approaches 1.5 MHz. The timing rules 306 of FIG. 6A include alternately staging amplifiers, emitting light, and reading light sensors between two banks.

At clock edge 0, the controller 116 may generate an amplifier power control signal to power on TIA 0 so that the amplifier can begin staging in anticipation of the corresponding photodiode 0 being read during the next clock cycle. The controller 116 may also maintain switch 0 in an open state while the TIA 0 is staged. This masks any transient signals caused by staging TIA 0 and prevents the corresponding photodiode 0 from being read until the amplifier 0 is at steady state. Moreover, in examples where the ADC 136(A) adheres to the timing rules 600, the ADC 136(A) anticipates reading photodiode 0 at the next clock tick (i.e., 1). In some examples, signals generated by the controller 116 may maintain any of the remaining switches (switches 130(2)-(*n*)) in an open state and keep the other amplifiers (amplifiers 130(2)-(*n*)) turned off.

At clock edge 1, the controller 116 may maintain power to TIA 0 and generate a switch control signal to close switch 0 so that the corresponding photodiode 0 may be read by the ADC of Bank 1. The light emitter 0 may also be fired at substantially the same time. In this example, the photodiode 0 is read for the duration of this clock cycle and/or a portion thereof and/or the next cycle (i.e., a read time of two clock cycles), although other durations are contemplated (e.g., one clock cycle, half a clock cycle). Additionally, the controller 116 may generate an amplifier power control signal to power on TIA 1 so that the corresponding photodiode 1 may be read at the next clock cycle. The controller 116 maintains the open state of switch 1 while TIA 1 is staging.

At clock edge 2, the controller 116 maintains power to TIA 0 and the closed state of switch 0 so that the ADC of Bank 1 may continue to read the amplified photodiode 0 signal. The controller 116 may also generate an amplifier power control signal to power on TIA 2 to prepare to read photodiode 2 during the next clock cycle, while maintaining switch 2 in an open state. The controller may also close switch 1 so that the amplified signal of photodiode 1 may be read by the ADC of Bank 2. The light emitter 1 may also be fired at substantially the same time.

At clock edge 3, the controller 116 may generate an amplifier power control signal to power off TIA 0 and a switch control signal to open switch 0 so that the signal of photodiode 0 is no longer seen by the ADC of Bank 1 and so that the ADC of Bank 1 can accurately read the amplified signal of photodiode 2. The controller 116 may maintain power to TIA 2 and generate a switch control signal to close switch 2 so that photodiode 2 may be read by the ADC of Bank 1. The light emitter 2 may also be fired at substantially the same time.

The controller 116 may also maintain power to TIA 1 and the closed state of switch 1 so that the ADC of Bank 2 may continue to read the amplified photodiode 1 signal. The controller 116 may also generate an amplifier power control signal to power on TIA 4 to prepare to read photodiode 4 during the next clock cycle.

This sequence may continue until all of the light sensors of the lidar system have been read.

In some examples, a calibration phase may be conducted to identify dead channels (i.e., channels that do not give accurate distance measurements). Upon identifying a dead channel, the controller 116 may be configured to generate a dead pin signal at the point in the sequence when the dead channel is to be staged. The dead pin signal causes the controller 116 to maintain power of the last amplifier and keep the last corresponding switch closed instead of powering off the last amplifier, opening the last corresponding switch, and powering on the amplifier associated with the dead channel. The controller 116 may maintain this state until the channel subsequent the dead channel in the sequence is to be staged.

FIG. 6B depicts a state and timing diagram for operating a lidar photosensor amplification circuit at a frequency of around 1.5 MHz. The timing rules 306 of FIG. 6B include simultaneously staging amplifiers, emitting light, and reading light sensors between two banks.

At clock edge 0, the controller 116 may generate amplifier power control signals to power on TIA 0 and TIA 1 so that the amplifiers can begin staging in anticipation of the corresponding photodiode 0 and photodiode 1 being read during the next clock cycle. The controller 116 may also maintain switch 0 and switch 1 in an open state while the TIA 0 and TIA 1 are staged. In some examples, signals generated by the controller may maintain any of the remaining switches (switches 130(2)-(*n*)) in an open state and keep the other amplifiers (amplifiers 130(2)-(*n*)) turned off.

At clock edge 1, the controller 116 may maintain power to TIA 0 and TIA 1 and generate switch control signals to close switch 0 and switch 1 so that the corresponding photodiode 0 and photodiode 1 may be read by the ADC of Bank 1 and the ADC of Bank 2, respectively. The light emitter 0 and light emitter 1 may also be fired at substantially the same time. In this example, the photodiode 0 is read for the duration of this clock cycle and the next cycle (i.e., a read time of two clock cycles), although other durations are contemplated (e.g., one clock cycle).

At clock edge 2, the controller 116 maintains power to TIA 0 and TIA 1 and the closed state of switch 0 and switch 1 so that the ADC of Bank 1 and the ADC of Bank 2 may continue to read the amplified photodiode 0 signal and the amplified photodiode 1 signal, respectively. The controller 116 may also generate an amplifier power control signal to power on TIA 2 and TIA 3 to prepare to read photodiode 2 and photodiode 3 during the next clock cycle, while maintaining switch 2 and switch 3 in an open state.

At clock edge 3, the controller 116 may generate an amplifier power control signal to power off TIA 0 and TIA 1 and a switch control signal to open switch 0 and switch 1 so that the signals of photodiode 0 and photodiode 1 are no longer seen by the ADC of Bank 1 and the ADC of Bank 2. Moreover, this allows the ADC of Bank 1 to accurately read the amplified signal of photodiode 2 and the ADC of Bank 1 to accurately read the amplified signal of photodiode 3. The light emitter 2 and light emitter 3 may also be fired concurrently (e.g., at substantially the same time). The controller 116 may maintain power to TIA 2 and TIA 3 and generate a switch control signal to close switch 2 and switch 3 so that photodiode 2 and photodiode 3 may be read by the ADC of Bank 1 and the ADC of Bank 2, respectively.

This sequence may continue until all of the light sensors of the lidar system have been read.

In some examples, if the firing frequency is increased (e.g., up to 4 MHz) more amplifiers may be staged per clock cycle according to either of timing rules 600 or timing rules 602. The number of amplifiers staged per clock cycle will also depend on the staging time of the amplifiers selected for the circuit. For example, at a firing frequency of 1-1.6 MHz and for an amplifier requiring a longer stage time, the amplifier may be turned on (staged) two clock cycles before the corresponding switch is opened.

Figure 7:
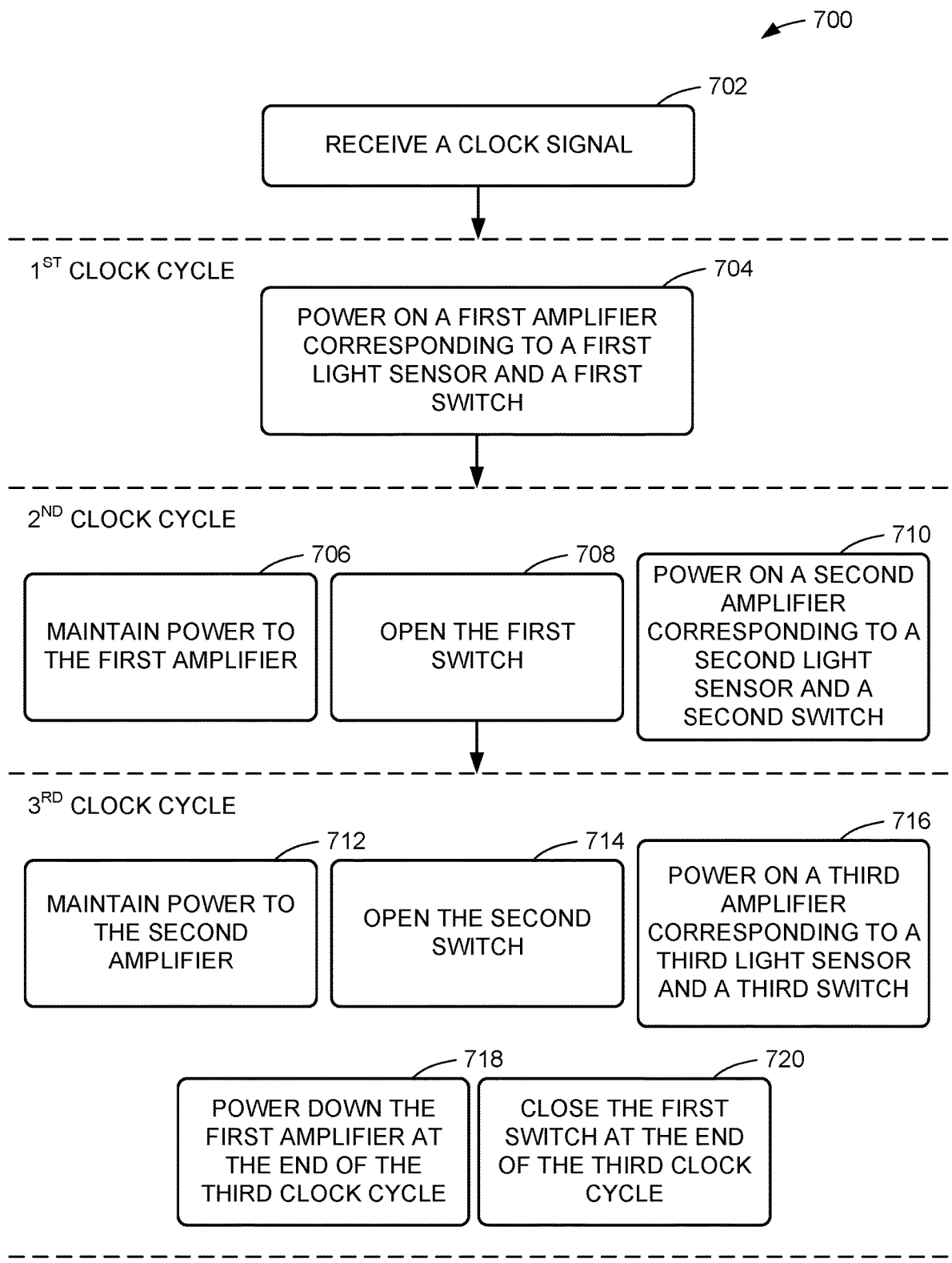
FIG. 7 is a flow diagram illustrating an example method of operating a photosensor amplification circuit according to the timing rules discussed herein.

FIG. 7 shows an example method 700 of operating the photosensor amplification circuit according to the timing rules 600. At 702, the controller 116 may receive a clock signal according to any of the techniques discussed herein. As used herein, "on a clock cycle" may refer to any portion of a clock cycle such as, for example, a rising edge, a falling edge, or a midpoint of the clock cycle.

At 704, on a first clock cycle of the clock signal, the controller 116 may power on a first amplifier corresponding to both a first light sensor and a first switch according to any of the techniques discussed herein. This may stage the first amplifier in preparation to read the first light sensor at a subsequent time. The controller 116 may generate the signal to power on the first amplifier before reading the first light sensor by at least a duration of time that equals a staging time of the first amplifier.

On a second clock cycle, the controller 116 may maintain power to the first amplifier at 706, open the first switch at 708, and power on a second amplifier corresponding to both a second light sensor and a second switch at 710, according to any of the techniques discussed herein. In this manner, the controller may allow the first light sensor to be read while the second amplifier is staged in preparation to read the second light sensor.

On a third clock cycle, the controller 116 may maintain power to the second amplifier at 712, close the second switch at 714, and power on a third amplifier corresponding to both a third light sensor and a third switch at 716, according to any of the techniques discussed herein. The controller may also power down the first amplifier, at 718, and open the first switch, at 720, at the end of the third clock cycle. By powering down the first amplifier and opening the first switch at the end (i.e., falling edge) of the third clock cycle, the ADC is able to continue to read the amplified light sensor signal of the first light sensor for the duration of the third clock cycle. In this manner, the example method 700 may conserve power supplied to the photosensor amplification circuit, may reduce heat produced by the light sensor board, and/or may reduce or remove interference with the next light sensor to be read.

Figure 8:
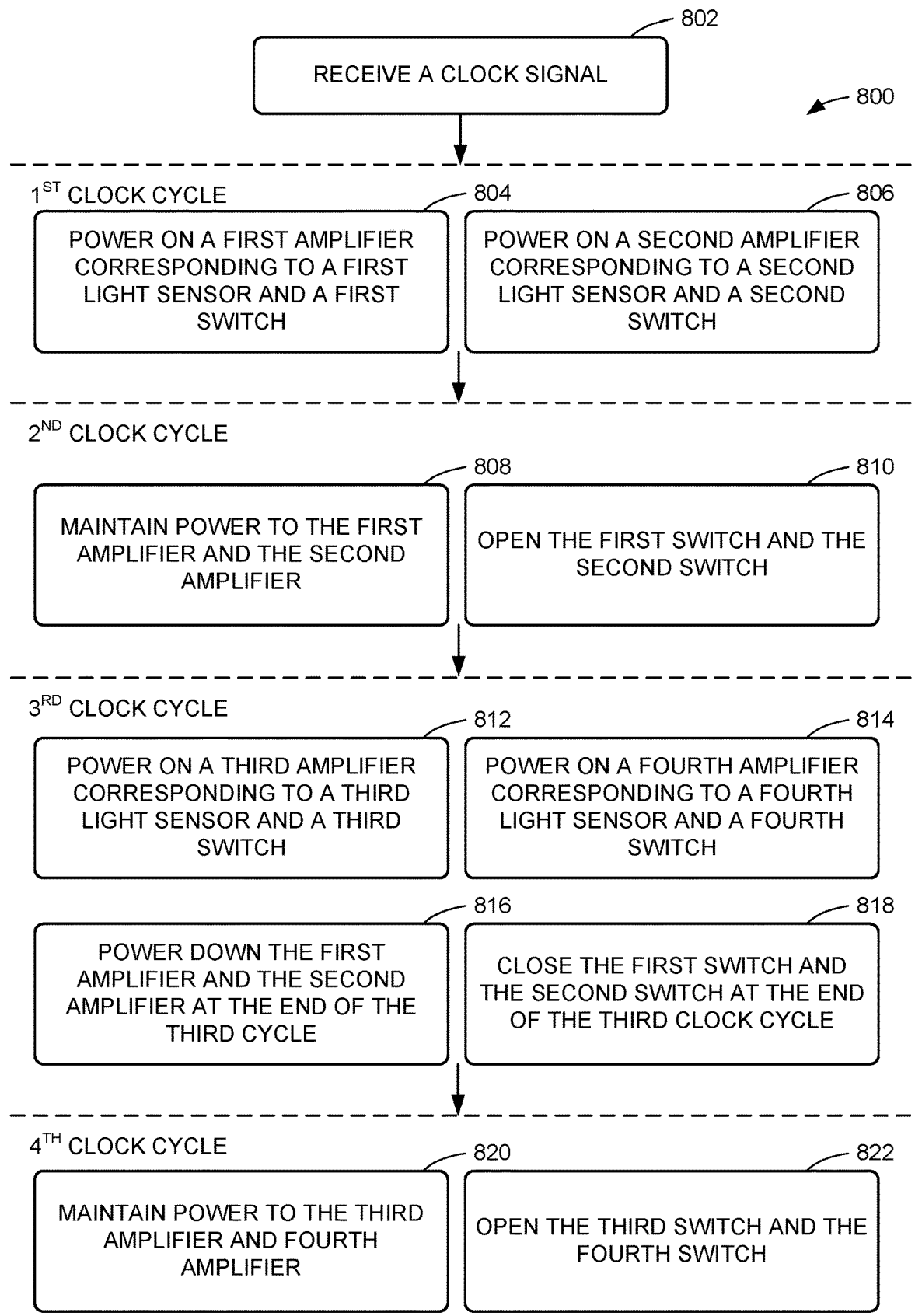
FIG. 8 is a flow diagram illustrating an example method of operating a photosensor amplification circuit according to the timing rules for operating the circuit at a higher frequency, as discussed herein.

FIG. 8 shows an example method 800 of operating the photosensor amplification circuit according to the timing rules 602. At 802, the controller 116 may receive a clock signal according to any of the techniques discussed herein.

On a first clock cycle, the controller 116 may power on at 804 a first amplifier corresponding to both a first light sensor and a first switch according to any of the techniques discussed herein. The controller 116 may also power on, at 806, a second amplifier corresponding to both a second light sensor and a second switch according to any of the techniques discussed herein. This may stage the first amplifier and the second amplifier to read the first light sensor and the second light sensor at a subsequent time. The controller 116 may generate the signal to power on the first amplifier and the second amplifier before closing the first switch and the second switch by at least a duration of time that equals a staging time of the first amplifier.

On a second clock cycle, the controller 116 may maintain power to the first amplifier and the second amplifier at 808 and close the first switch and the second switch at 810. In this example manner, controller 116 may substantially simultaneously stage channels of two banks at 804 and 806 and at 808 and 810 concurrently (e.g., substantially simultaneously) make those channels available to be read by respective ADCs.

On a third clock cycle, the controller 116 may power on, at 812, a third amplifier corresponding to both a third light sensor and a third switch according to any of the techniques discussed herein. The controller 116 may also power on, at 814, a fourth amplifier corresponding to both a fourth light sensor and a fourth switch according to any of the techniques discussed herein. The controller 116 may also power down the first amplifier and the second amplifier, at 816, and open the first switch and the second switch, at 818, at the end of the third clock cycle. By powering down the first amplifier and the second amplifier and opening the first switch and the second switch at the end of the third clock cycle, the respective ADCs are able to continue to read the amplified light sensor signal of the first and second light sensors for the duration of the third clock cycle.

On a fourth clock cycle, the controller 116 may maintain power to the third amplifier and the fourth amplifier at 820 and close the third switch and the fourth switch at 822. In this manner, the example method 800 may conserve power supplied to the light sensor board, may reduce heat produced by the photosensor amplification circuit, and/or may reduce or remove interference with the next light sensor to be read while permitting for a higher emission/reading frequency (e.g., 1.5 MHz) without cross-talk.

Example Clauses

A. A device comprising: a plurality of light sensors, each light sensor configured to generate an output signal based at least in part on receiving light; a plurality of amplifiers, an individual amplifier connected to an individual light sensor of the plurality of light sensors and configured to output an amplified output signal in a powered-on state based at least in part on the output signal of the individual light sensor; a plurality of switches, each switch connected to a different amplifier and controllable to pass a respective amplified output in a closed state or disconnect the amplified output in an open state; and a controller operatively connected to the plurality of amplifiers and the plurality switches and configured to: receive a clock signal; at a first transition of the clock signal, power on a first amplifier corresponding to both a first light sensor and a first switch; at a second transition of the clock signal, subsequent to the first transition: maintain power to the first amplifier, close the first switch, and power on a second amplifier corresponding to both a second light sensor and a second switch; at a third transition of the clock signal, subsequent to the second transition: maintain power to the second amplifier, close the second switch, and power on a third amplifier corresponding to both a third light sensor and a third switch; and at a fourth transition of the clock signal, subsequent to the third transition: power down the first amplifier, open the first switch, maintain power to the third amplifier, and close the third switch.

B. The device as paragraph A recites, wherein: at the first transition, the controller keeps the first switch, the second switch, and the third switch open; at the second transition, the controller closes the first switch, between the second transition and the third transition, the controller keeps the second switch and the third switch open; at the third transition, the controller closes the second switch, between the third transition and the fourth transition, the controller keeps the first switch and the second switch closed and the third switch open; at the fourth transition, the controller opens the first switch and closes the third switch; between the fourth transition and a fifth transition, the controller keeps the second switch and the third switch closed.

C. The device as either paragraph A or B recites, wherein: the device is a lidar device; and the device further comprises a plurality of laser emitters, each laser emitter corresponding to one or more of the light sensors.

D. The device as any one of paragraphs A-C recites, the controller further configured to: cause a first light emitter to emit a first pulse of light at the second transition, the first light emitter being associated with the first light sensor; cause a second light emitter to emit a second pulse of light at the third transition, the second light emitter being associated with the second light sensor; and cause a third light emitter to emit a third pulse of light at the fourth transition, the third light emitter being associated with the third light sensor.

E. The device as any one of paragraphs A-D recites, wherein: the first light sensor and the third light sensor are members of a first bank of light sensors, the first light emitter and the third light emitter are members of a first bank of light emitters, the second light sensor is a member of a second bank of light sensors, and the second light emitter is a member of a second bank of light emitters.

F. The device as any one of paragraphs A-E recites, the controller further configured to: receive a dead pin signal identifying a dead light sensor; and based at least in part on receiving the dead pin signal and during at least a portion of a clock cycle associated with the dead light sensor: skip closing a switch associated with dead light sensor maintain power to an amplifier that was powered on prior to the clock cycle associated with the dead light sensor, and maintain a state of the switches during the portion of the clock cycle associated with the dead light sensor.

G. The device as any one of paragraphs A-F recites, wherein the dead pin signal is received based at least in part on calibrating channels associated with the plurality of light sensors.

H. The device as any one of paragraphs A-G recites, further comprising an analog-to-digital converter and wherein: outputs of the first switch and the third switch are configured as inputs to the ADC; closing the first switch allows an amplified signal from the first light sensor to be communicated to the ADC; and closing the second switch allows an amplified signal from the second light sensor to be communicated to the ADC.

I. A device comprising: a plurality of light sensors configured to generate an output signal based at least in part on receiving light; a plurality of amplifiers, an individual amplifier connected to an individual light sensor of the plurality of light sensors and configured to output an amplified output signal in a powered-on state based at least in part on the output signal of the individual light sensor; a plurality of switches, each switch connected to a different amplifier and controllable to pass a respective amplified output in a closed state or disconnect the amplified output in an open state; a controller operatively connected to the amplifiers and the switches and configured to: receive a clock signal; at a first transition of the clock signal: power on a first amplifier corresponding to both a first light sensor and a first switch, and power on a second amplifier corresponding to both a second light sensor and a second switch; at a second transition of the clock signal, subsequent to the first transition: maintain power to the first amplifier and the second amplifier, and close the first switch and the second switch, at a third transition of the clock signal, subsequent to the second transition: power on a third amplifier corresponding to both a third light sensor and a third switch, and power on a fourth amplifier corresponding both to a fourth light sensor and a fourth switch; and at a fourth transition of the clock signal, subsequent to the third transition: power down the first amplifier and the second amplifier, open the first switch and the second switch, maintain power to the third amplifier and the fourth amplifier, and close the third switch and the fourth switch.

J. The device as paragraph I recites, wherein: the device is a lidar device; and the device further comprises laser emitters corresponding respectively to the light sensors.

K. The device as either paragraph I or J recites, the controller further configured to: cause a first light emitter to emit a first pulse of light at the second transition of the clock signal, the first light emitter being associated with the first light sensor; cause a second light emitter to emit a second pulse of light at the second transition of the clock signal, the second light emitter being associated with the second light sensor; cause a third light emitter to emit a third pulse of light at the fourth transition of the clock signal, the third light emitter being associated with the third light sensor; and cause a fourth light emitter to emit a fourth pulse of light at the fourth transition of the clock signal, the fourth light emitter being associated with the fourth light sensor.

L. The device as any one of paragraphs I-K recites, wherein: the first light sensor and the third light sensor are members of a first bank of light sensors, the first light emitter and the third light emitter are members of a first bank of light emitters, the second light sensor and the fourth light sensor are members of a second bank of light sensors, and the second light emitter and the fourth light emitter are members of a second bank of light emitters.

M. The device as any one of paragraphs I-L recites, wherein the controller is further configured to: cause the first light emitter and the second light emitter to emit pulses of light substantially simultaneously; and cause the third light emitter and the fourth light emitter to emit pulses of light substantially simultaneously.

N. The device as any one of paragraphs I-M recites, the controller further configured to: receive a dead pin signal identifying a dead light sensor; and based at least in part on receiving the dead pin signal and during at least a portion of a clock cycle associated with the dead light sensor: skip closing a switch associated with dead light sensor, maintain power to an amplifier that was powered on prior to the clock cycle associated with the dead light sensor, and maintain a state of the switches during the portion of the clock cycle associated with the dead light sensor.

O. The device as any one of paragraphs I-N recites, further comprising an analog-to-digital converter and wherein: the closed state of the individual switch passes the respective amplified signal of a corresponding individual sensor to the analog-to-digital converter; and the open state of the individual switch disconnects the respective amplified signal.

P. A method of operating a lidar device, the method comprising: emitting a light pulse via a light emitter; and sensing a reflected light pulse via a light sensor for a duration of a read time, at least in part, by: powering on an amplifier before emitting the light pulse, the amplifier amplifying an output signal of the light sensor indicating reception of the reflected light pulse to form an amplified signal; closing a switch after a duration of staging time passes from powering on the amplifier, the switch configured to pass the amplified signal to an analog-to-digital converter; powering off the amplifier after the duration of the reading time passes from closing the switch; and opening the switch after the duration of the reading time passes from closing the switch.

Q. The method as paragraph P recites, wherein: the switch is open before the amplifier is powered on, the staging time corresponds to a time before the light pulse is emitted, and the staging time has a duration such that the amplifier reaches a steady state before the switch is closed.

R. The method as either paragraph P or Q recites, wherein the duration of the staging time corresponds to at least one clock cycle and the duration of the reading time corresponds to at least two clock cycles.

S. The method as any one of paragraphs P-R recites, wherein: the light emitter is a first light emitter of a first bank of light emitters, the light pulse is a first light pulse, the light sensor is a first light sensor of a first bank of light sensors, the reflected light pulse is a first reflected light pulse, the amplifier is a first amplifier, and the switch is a first switch; the method further comprises: powering on the first amplifier corresponding to the first light sensor and a second amplifier corresponding to the second light sensor; closing, after a duration of staging time passes, the first switch corresponding to the first light sensor and a second switch corresponding to the second light sensor; substantially simultaneously emitting the first light pulse from the first light emitter of the first bank of light emitters and a second light pulse from a second light emitter of a second bank of light emitters; substantially simultaneously sensing the first reflected light pulse via a first light sensor of the first bank of light sensors and a second reflected light pulse via a second light sensor of a second bank of light sensors; substantially simultaneously powering off the first amplifier and the second amplifier after the duration of the reading time passes from closing the first switch and the second switch; and substantially simultaneously opening the first switch and the second switch after the duration of the reading time passes from closing the first switch.

T. The method as any one of paragraphs P-S recites, wherein: the light emitter is a first light emitter of a first bank of light emitters, the light pulse is a first light pulse, the light sensor is a first light sensor of a first bank of light sensors, the reflected light pulse is a first reflected light pulse, the amplifier is a first amplifier, and the switch is a first switch; and the method further comprising: alternately emitting the first light pulse from the first light emitter of the first bank of light emitters and a second light pulse from a second light emitter of a second bank of light emitters; alternately sensing the first reflected light pulse via a first light sensor of the first bank of light sensors and a second reflected light pulse via a second light sensor of a second bank of light sensors; powering on the first amplifier corresponding to the first light sensor and a second amplifier corresponding to the second light sensor; closing the first switch corresponding to the first light sensor after the duration of the staging time passes from powering on the first amplifier; closing a second switch corresponding to the second light sensor after the duration of the staging time passes from powering on the second amplifier; powering off the first amplifier after the duration of the reading time passes from closing the first switch; opening the first switch after the duration of the reading time passes from closing the first switch; powering off the second amplifier after the duration of the reading time passes from closing the second switch; and opening the second switch after the duration of the reading time passes from closing the second switch.

U. The method as any one of paragraphs P-T recites further comprising: receiving a dead pin indication based at least in part on calibrating a channel associated with the light sensor; and based at least in part on the dead pin indication, skipping closing the switch.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A device comprising:
 a plurality of light sensors, each light sensor configured to generate an output signal based at least in part on receiving light;
 a plurality of amplifiers, an individual amplifier connected to an individual light sensor of the plurality of light sensors and configured to output an amplified output signal in a powered-on state based at least in part on the output signal of the individual light sensor;
 a plurality of switches, each switch connected to a different amplifier and controllable to pass a respective amplified output in a closed state or disconnect the amplified output in an open state; and
 a controller operatively connected to the plurality of amplifiers and the plurality of switches and configured to:
  receive a clock signal;
  at a first transition of the clock signal, power on a first amplifier corresponding to both a first light sensor and a first switch;
  at a second transition of the clock signal, subsequent to the first transition:
   maintain power to the first amplifier, close the first switch, and
power on a second amplifier corresponding to both a second light sensor and a second switch, wherein the second light sensor is proximate the first light sensor;
at a third transition of the clock signal, subsequent to the second transition:
maintain power to the second amplifier,
close the second switch, and
power on a third amplifier corresponding to both a third light sensor and a third switch, wherein the third light sensor is proximate the first light sensor and the second light sensor; and
at a fourth transition of the clock signal, subsequent to the third transition:
power down the first amplifier,
open the first switch,
maintain power to the third amplifier, and
close the third switch.

2. The device as claim 1 recites, wherein:
at the first transition, the controller keeps the first switch, the second switch, and the third switch open;
at the second transition, the controller closes the first switch;
between the second transition and the third transition, the controller keeps the second switch and the third switch open;
at the third transition, the controller closes the second switch;
between the third transition and the fourth transition, the controller keeps the first switch and the second switch closed and the third switch open;
at the fourth transition, the controller opens the first switch and closes the third switch; and
between the fourth transition and a fifth transition, the controller keeps the second switch and the third switch closed.

3. The device as claim 1 recites, wherein:
the device is a lidar device; and
the device further comprises a plurality of laser emitters, each laser emitter corresponding to one or more light sensors of the plurality of light sensors.

4. The device as claim 3 recites, the controller further configured to:
cause a first light emitter to emit a first pulse of light at the second transition, the first light emitter being associated with the first light sensor;
cause a second light emitter to emit a second pulse of light at the third transition, the second light emitter being associated with the second light sensor; and
cause a third light emitter to emit a third pulse of light at the fourth transition, the third light emitter being associated with the third light sensor.

5. The device as claim 4 recites, wherein:
the first light sensor and the third light sensor are members of a first bank of light sensors,
the first light emitter and the third light emitter are members of a first bank of light emitters,
the second light sensor is a member of a second bank of light sensors, and
the second light emitter is a member of a second bank of light emitters.

6. The device as claim 1 recites, the controller further configured to:
receive a dead pin signal identifying a dead light sensor; and
based at least in part on receiving the dead pin signal and during at least a portion of a clock cycle associated with the dead light sensor:
skip closing a switch associated with dead light sensor,
maintain power to an amplifier that was powered on prior to the clock cycle associated with the dead light sensor, and
maintain a state of the plurality of switches during the portion of the clock cycle associated with the dead light sensor.

7. The device as claim 6 recites, wherein the dead pin signal is received based at least in part on calibrating channels associated with the plurality of light sensors.

8. The device as claim 1 recites, further comprising an analog-to-digital converter (ADC) and wherein:
outputs of the first switch and the third switch are configured as inputs to the ADC;
closing the first switch allows an amplified signal from the first light sensor to be communicated to the ADC; and
closing the second switch allows an amplified signal from the second light sensor to be communicated to the ADC.

9. A device comprising:
a plurality of light sensors configured to generate an output signal based at least in part on receiving light;
a plurality of amplifiers, an individual amplifier connected to an individual light sensor of the plurality of light sensors and configured to output an amplified output signal in a powered-on state based at least in part on the output signal of the individual light sensor;
a plurality of switches, each switch connected to a different amplifier of the plurality of amplifiers and controllable to pass a respective amplified output in a closed state or disconnect the respective amplified output in an open state;
a controller operatively connected to the plurality of amplifiers and the plurality of switches and configured to:
receive a clock signal;
at a first transition of the clock signal:
power on a first amplifier corresponding to both a first light sensor and a first switch, and
power on a second amplifier corresponding to both a second light sensor and a second switch, wherein the second light sensor is proximate the first light sensor;
at a second transition of the clock signal, subsequent to the first transition:
maintain power to the first amplifier and the second amplifier, and
close the first switch and the second switch,
at a third transition of the clock signal, subsequent to the second transition:
power on a third amplifier corresponding to both a third light sensor and a third switch, wherein the third light sensor is proximate the first light sensor and the second light sensor; and
power on a fourth amplifier corresponding both to a fourth light sensor and a fourth switch, wherein the fourth light sensor is proximate the first light sensor, the second light sensor, and the third light sensor; and
at a fourth transition of the clock signal, subsequent to the third transition:
power down the first amplifier and the second amplifier,
open the first switch and the second switch, maintain power to the third amplifier and the fourth amplifier, and
close the third switch and the fourth switch.

10. The device as claim 9 recites, wherein:
the device is a lidar device; and
the device further comprises a plurality of laser emitters, individual laser emitters of the plurality of laser emitters being associated with individual light sensors of the plurality of light sensors.

11. The device as claim 10 recites, the controller further configured to:
cause a first light emitter to emit a first pulse of light at the second transition of the clock signal, the first light emitter being associated with the first light sensor;
cause a second light emitter to emit a second pulse of light at the second transition of the clock signal, the second light emitter being associated with the second light sensor;
cause a third light emitter to emit a third pulse of light at the fourth transition of the clock signal, the third light emitter being associated with the third light sensor; and
cause a fourth light emitter to emit a fourth pulse of light at the fourth transition of the clock signal, the fourth light emitter being associated with the fourth light sensor.

12. The device as claim 11 recites, wherein:
the first light sensor and the third light sensor are members of a first bank of light sensors,
the first light emitter and the third light emitter are members of a first bank of light emitters,
the second light sensor and the fourth light sensor are members of a second bank of light sensors, and
the second light emitter and the fourth light emitter are members of a second bank of light emitters.

13. The device as claim 11 recites, wherein the controller is further configured to:
cause the first light emitter and the second light emitter to emit pulses of light substantially simultaneously; and
cause the third light emitter and the fourth light emitter to emit pulses of light substantially simultaneously.

14. The device as claim 9 recites, the controller further configured to:
receive a dead pin signal identifying a dead light sensor; and
based at least in part on receiving the dead pin signal and during at least a portion of a clock cycle associated with the dead light sensor:
skip closing a switch associated with dead light sensor,
maintain power to an amplifier that was powered on prior to the clock cycle associated with the dead light sensor, and
maintain a state of the plurality of switches during the portion of the clock cycle associated with the dead light sensor.

15. The device as claim 9 recites, further comprising an analog-to-digital converter and wherein:
the closed state of an individual switch passes a respective amplified signal of a corresponding individual sensor to the analog-to-digital converter; and
the open state of the individual switch disconnects the respective amplified signal.

16. A method of operating a lidar device, the method comprising:
emitting a light pulse via a light emitter; and
sensing a reflected light pulse via a light sensor for a duration of a reading time, at least in part, by:
powering on an amplifier before emitting the light pulse, the amplifier amplifying an output signal of the light sensor indicating reception of the reflected light pulse to form an amplified signal;
closing a switch after a duration of staging time passes from powering on the amplifier, the switch configured to pass the amplified signal to an analog-to-digital converter;
powering off the amplifier after the duration of the reading time passes from closing the switch; and
opening the switch after the duration of the reading time passes from closing the switch,
wherein the reading time is different than a second reading time associated with a second light sensor proximate the light sensor.

17. The method as claim 16 recites, wherein:
the switch is open before the amplifier is powered on,
the staging time corresponds to a time before the light pulse is emitted, and the staging time has a duration such that the amplifier reaches a steady state before the switch is closed.

18. The method as claim 16 recites, wherein the duration of the staging time corresponds to at least one clock cycle and the duration of the reading time corresponds to at least two clock cycles.

19. The method as claim 16 recites, wherein:
the light emitter is a first light emitter of a first bank of light emitters,
the light pulse is a first light pulse,
the light sensor is a first light sensor of a first bank of light sensors,
the reflected light pulse is a first reflected light pulse,
the amplifier is a first amplifier, and
the switch is a first switch;
the method further comprises:
powering on the first amplifier corresponding to the first light sensor and a second amplifier corresponding to the second light sensor;
closing, after a duration of staging time passes, the first switch corresponding to the first light sensor and a second switch corresponding to the second light sensor;
substantially simultaneously emitting the first light pulse from the first light emitter of the first bank of light emitters and a second light pulse from a second light emitter of a second bank of light emitters;
substantially simultaneously sensing the first reflected light pulse via a first light sensor of the first bank of light sensors and a second reflected light pulse via a second light sensor of a second bank of light sensors;
substantially simultaneously powering off the first amplifier and the second amplifier after the duration of the reading time passes from closing the first switch and the second switch; and
substantially simultaneously opening the first switch and the second switch after the duration of the reading time passes from closing the first switch.

20. The method as claim 16 recites, wherein:
the light emitter is a first light emitter of a first bank of light emitters,
the light pulse is a first light pulse,
the light sensor is a first light sensor of a first bank of light sensors,
the reflected light pulse is a first reflected light pulse,
the amplifier is a first amplifier, and
the switch is a first switch; and
the method further comprising:

alternately emitting the first light pulse from the first light emitter of the first bank of light emitters and a second light pulse from a second light emitter of a second bank of light emitters;

alternately sensing the first reflected light pulse via a first light sensor of the first bank of light sensors and a second reflected light pulse via a second light sensor of a second bank of light sensors;

powering on the first amplifier corresponding to the first light sensor and a second amplifier corresponding to the second light sensor;

closing the first switch corresponding to the first light sensor after the duration of the staging time passes from powering on the first amplifier;

closing a second switch corresponding to the second light sensor after the duration of the staging time passes from powering on the second amplifier;

powering off the first amplifier after the duration of the reading time passes from closing the first switch;

opening the first switch after the duration of the reading time passes from closing the first switch;

powering off the second amplifier after the duration of the reading time passes from closing the second switch; and opening the second switch after the duration of the reading time passes from closing the second switch.

21. The method as claim 16 recites further comprising:

receiving a dead pin indication based at least in part on calibrating a channel associated with the light sensor; and based at least in part on the dead pin indication, skipping closing the switch.

* * * * *